(12) United States Patent
Pattikonda

(10) Patent No.: US 8,228,382 B2
(45) Date of Patent: Jul. 24, 2012

(54) SYSTEM AND METHOD FOR COUNTING PEOPLE

(76) Inventor: Ram Pattikonda, Richardson, TX (US)

( * ) Notice: Subject to any disclaimer, the term of this patent is extended or adjusted under 35 U.S.C. 154(b) by 1557 days.

(21) Appl. No.: 11/555,869

(22) Filed: Nov. 2, 2006

(65) Prior Publication Data

US 2008/0008360 A1    Jan. 10, 2008

Related U.S. Application Data

(60) Provisional application No. 61/733,417, filed on Nov. 5, 2005.

(51) Int. Cl.
*H04N 5/225* (2006.01)
(52) U.S. Cl. ......... 348/169; 348/170; 382/118; 382/103
(58) Field of Classification Search .................. 348/169, 348/170; 382/118, 103
See application file for complete search history.

(56) References Cited

U.S. PATENT DOCUMENTS

| | | | |
|---|---|---|---|
| 6,442,476 B1 | 8/2002 | Poropat | |
| 6,678,413 B1 | 1/2004 | Liang et al. | |
| 6,697,104 B1 | 2/2004 | Yakobi et al. | |
| 7,110,569 B2 * | 9/2006 | Brodsky et al. | 348/169 |
| 2004/0145658 A1 * | 7/2004 | Lev-Ran et al. | 348/143 |
| 2004/0239503 A1 * | 12/2004 | Rider et al. | 340/572.1 |
| 2004/0249567 A1 * | 12/2004 | Stiller | 701/207 |
| 2006/0062429 A1 * | 3/2006 | Ramaswamy et al. | 382/103 |
| 2006/0067456 A1 * | 3/2006 | Ku et al. | 377/6 |
| 2006/0093185 A1 * | 5/2006 | Kato et al. | 382/103 |
| 2006/0245624 A1 * | 11/2006 | Gallagher et al. | 382/118 |
| 2007/0297649 A1 * | 12/2007 | Nakanishi | 382/118 |

* cited by examiner

*Primary Examiner* — Philip B Tran
(74) *Attorney, Agent, or Firm* — Michael Diaz

(57) ABSTRACT

A system for counting people in a specified area. The system includes a camera for capturing an image of the specified area and a computer for receiving the captured image. The computer analyzes the image to detect people by detecting head or face shapes in the image. The computer counts the detected head or face shapes to determine a number of people within the specified area. The computer may confirm that the head or face shapes are human by determining if the shapes have the approximate coloration of a human. The system may detect stationary or moving persons. In addition, the system may detect the presence of video recording devices in a room. The system may also detect if a seat is occupied by determining that a pattern in the seat is blocked or the outline of the seat is blocked.

18 Claims, 5 Drawing Sheets

To FIG. 4B

SYSTEM AND METHOD FOR COUNTING PEOPLE

RELATED APPLICATIONS

This utility application claims the benefit of U.S. Provisional Patent Application Ser. No. 60/733,417 by Ram Pattikonda, filed Nov. 5, 2005, and is hereby incorporated by reference.

BACKGROUND OF THE INVENTION

1. Field of the Invention

This invention relates to counting systems. Specifically, and not by way of limitation, the present invention relates to a system and method for counting people by capturing an image of human heads and faces, analyzing the captured image and counting the people in the image.

2. Description of the Related Art

In many instances, it is imperative to obtain an accurate count of people in a particular area. For example, in marketing analysis, a count of persons is necessary to obtain accurate input data for the analysis. In other instances, for example, in movie theaters, it is beneficial to the owner or movie distributor to know that movie collections are audited and accounted.

Traditional methods of counting people have oftentimes employed people to manually count the persons in a room. However, this method is inaccurate and utilizes expensive manpower. In other situations, methods utilize sensors, such as seat sensors to measure a sitting audience or infrared sensors to measure people moving from one place to another. However, the use of sensors is expensive which often involves extensive modification of an area or seats being observed. In the case of the infrared sensors to measure moving persons, the system requires a narrow passageway and is not useable where a large group of people move together.

Although there are no known prior art teachings of a system or apparatus such as that disclosed herein, a prior art reference that discusses subject matter that bears some relation to matters discussed herein is U.S. Patent Application Publication No. 2006/0062429 to Ramaswamy et al. (Ramaswamy). Ramaswamy discloses a method and apparatus to count people appearing in an image. Ramaswamy discloses reducing objects appearing in a series of images to one or more blobs. For each individual image in a set of images, one or more blobs in the individual image are represented by one or more symbols in a histogram. The symbols are analyzed in the histogram to count the people in the image. Although Ramaswamy discloses some image-based techniques, Ramaswamy merely utilizes a rudimentary image processing method that attempts to distinguish the difference from one image to another. This methodology disclosed a methodology that observes the blobs from different images and applies simple rules to see if these blobs are human. However, Ramaswamy suffers from several disadvantages. Ramaswamy discloses a methodology where the accuracy of the people count is very low due to the application of rudimentary rules on differences within the images. Additionally, Ramaswamy discloses a methodology which uses a human detection rule which assumes the position of a television watching audience and is designed to work only with a television watching audience. Because of the low accuracy of the methodology, user input is required to confirm the audience count. Ramaswamy is also only useable with a small number of people and fails to produce acceptable results for larger audiences. In addition, Ramaswamy requires special illumination or special positioning of a camera.

Accordingly, a system and method are needed which provides an accurate count of people without utilizing expensive hardware or require human intervention. It is an object of the present invention to provide such a method and system.

SUMMARY OF THE INVENTION

In one aspect, the present invention is a system for counting people in a specified area. The system includes a camera for capturing an image of the specified area and a computer for receiving the captured image. The computer analyzes the image to detect people by detecting head or face shapes in the image. The computer counts the detected head or face shapes to determine a number of people within the specified area. The computer may confirm that the head or face shapes are human by determining if the shapes have the approximate coloration of a human. The system may detect stationary or moving persons. In addition, the system may detect the presence of video recording devices in a room.

In another aspect, the present invention is a method of counting people in a specified area. The method begins by a camera capturing an image of the specified area. The image is then analyzed by a computer to detect people in the image. The computer detects images by detecting head or face shapes in the image. The computer then counts the shapes of faces or heads to determine a number of people within the specified area.

In another aspect, the present invention is a system for counting people in a specified area. The system includes a camera for capturing an image of the specified area having a plurality of seats and a computer for receiving the captured image. The computer analyzes the image to determine if each seat is occupied when a seat is blocked from view in the captured image to obtain a count of people within the specified area.

DESCRIPTION OF THE INVENTION

Figure 1:
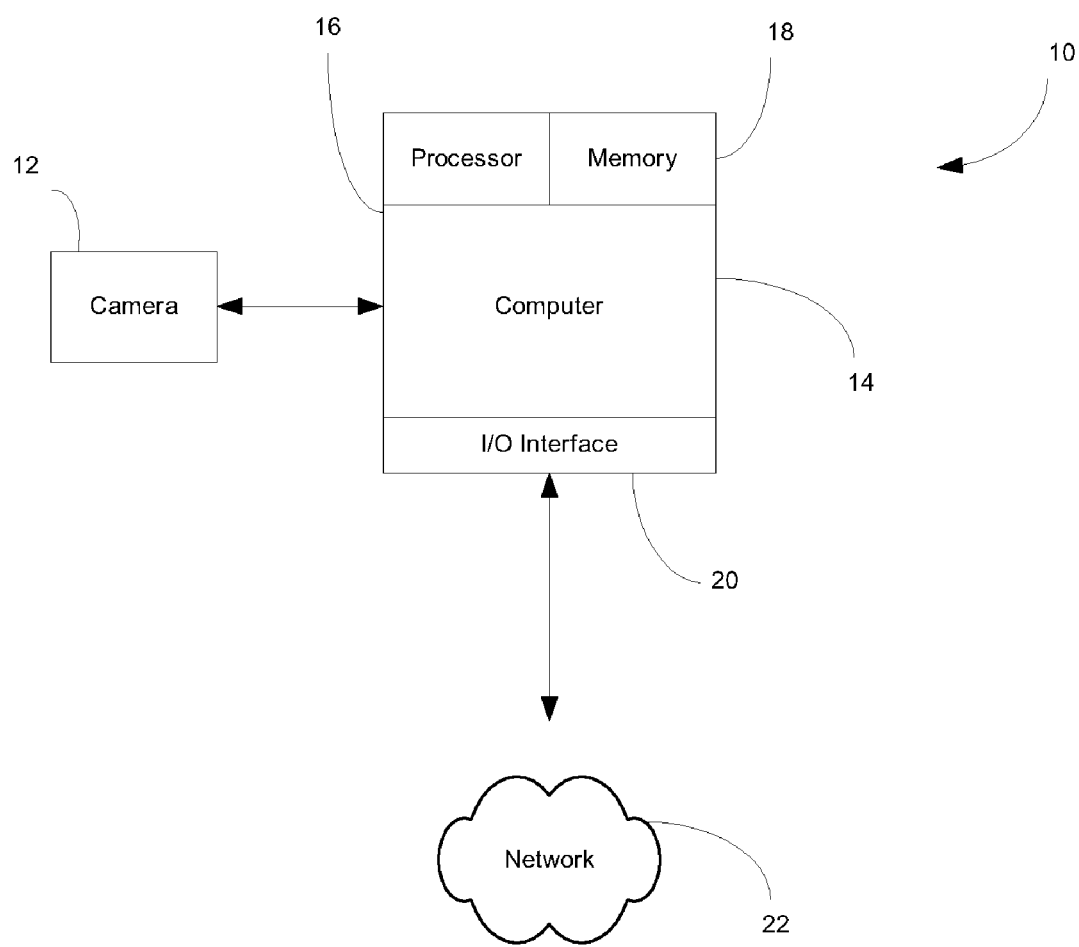
FIG. 1 is a simplified block diagram illustrating the components of a counting system in the preferred embodiment of the present invention.

The present invention is a system and method for counting people in a specified area. FIG. 1 is a simplified block diagram illustrating the components of a counting system 10 in the preferred embodiment of the present invention. The system includes a camera 12 communicating with a computer 14. The computer includes a processor 16, a memory 18, and an input/output (I/O) interface 20. The computer 14 is optionally coupled to a network 22, such as the Internet. The I/O interface may be a keyboard and mouse for use by an operator to control the computer 14.

Figure 2:
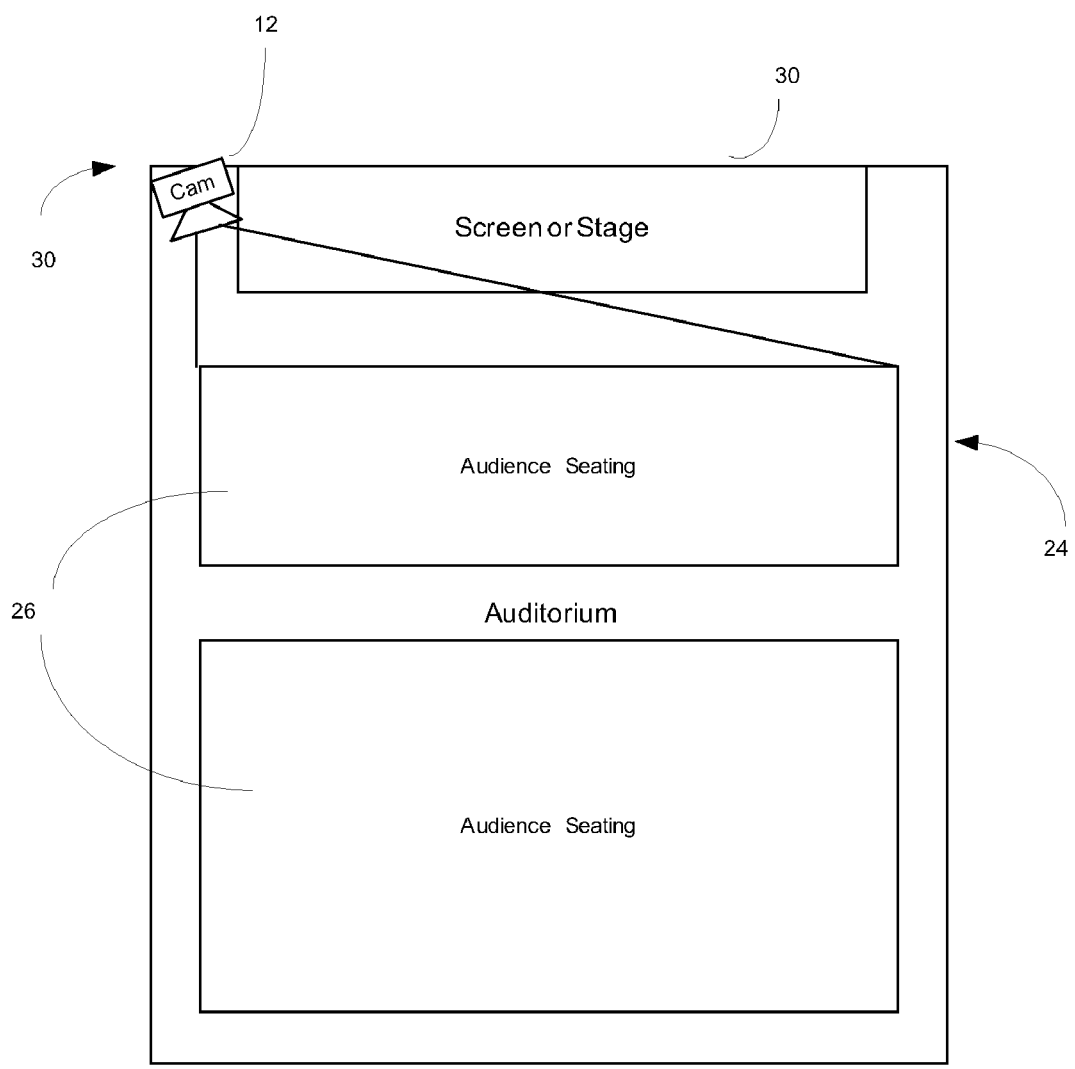
FIG. 2 is a top simplified diagram of the camera of the counting system utilized in an area.

FIG. 2 is a top simplified diagram of the camera 12 of the counting system 10 utilized in an area 24. The area 24 may be a room or other space for which people are located. In FIG. 2, by example only, the area is an auditorium having an audience seating 26. The camera is preferably positioned in such a manner as to provide a full view of the audience without interfering with the normal operation of the area. In the case of a cinema or auditorium, the camera is preferably placed in a corner 30 next to the screen or stage 32 at a height halfway up from the ceiling.

When viewing a large amount of people, the camera 12 is preferably a high resolution digital camera (e.g., a resolution of at least 8 Mb) with a wide view lens. However, any camera, either digital or analog at any resolution may be used in the present invention. In the preferred embodiment of the present invention, the objective is to get the full view of the audience so that all the faces of the audience are seen by the camera 12. The perspective and angular distortion created by the positioning of the camera 12 in the corner may be compensated by utilizing geometrical mapping during setup and during image processing. In addition, the camera may be set at a high aperture with a large exposure to obtain bright images of the audience without the use of additional lighting. Additionally, infrared light may be employed to illuminate the audience to obtain bright pictures without the audience noticing any additional light.

Prior to utilizing the counting system 10, the computer 14 and camera are initialized. Scene data of the specified area 24 is loaded into the computer 14. The scene data contains positions of stationary or static portions of the image of the specified area. For example, for an auditorium, the positions of the seats in the field of view are loaded. This scene data may be programmed automatically or manually during a one time setup of the system. Additionally, the system may be programmed to select count times when the counting system is activated. When it is time to count, the camera captures an image of the scene. The image is digitized if an analog camera is utilized. The image is then passed to the memory 18 of the computer 14.

The computer performs an analysis of the captured image. The number of people in the scene is determined by either recognizing the shapes of faces or heads in the scene. Alternately, the computer may analyze the image to detect missing patterns in the static portion of the image, such as the back of the seats. For example, a seat may have a pattern on the seat. If a person is sitting in a seat, the person blocks the view of the back of the seat, therefore the computer determines that the seat is occupied with a person. Alternately, the computer may determine that the outline of the seat is blocked. This alternate analysis may be utilized in conjunction or separately from analyzing the image to detect shapes of humans.

Figure 3:
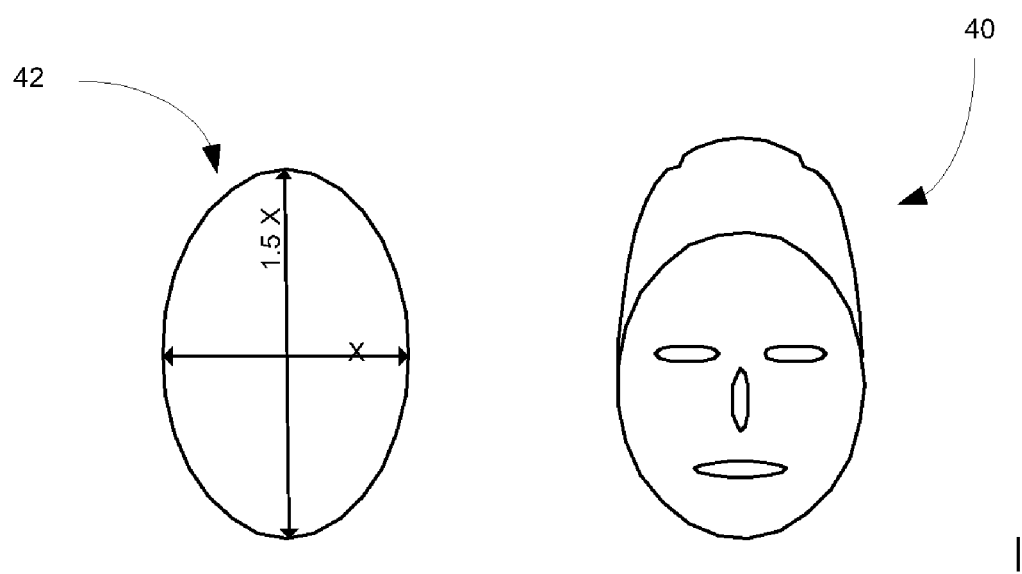
FIG. 3 is an illustration of the dimensioning of a typical head for use with the counting system.

The counting system may detect heads and faces located near seats and may detect the heads and faces in open areas. In the preferred embodiment of the present invention, the size of the head, as seen in the image, may be computed based on the size of the seat. FIG. 3 is an illustration of the dimensioning of a typical head 40 for use with the counting system 10. Preferably, the general shape of the head is assumed to be elliptical shape 42 with a horizontal dimension of X and a vertical dimension of 1.5X and is utilized to form an edge pattern by the computer. The size X may be computed based upon magnification of a nearby seat. The computer utilizes this edge pattern to search the captured image in gray scale and hue (color portion) of the image. If a human head is present, an edge gradient around the generated ellipse is strong. A variable operator may be used to compensate for changes in size and shape of the head from person to person. In addition, face confirmation on the counted faces or heads may be conducting by geometrically matching eyes, noses, and lips of the detected faces.

In determining the presence of a human head, a color analysis of the shapes in the image is also conducted. Although humans have wide skin colors, in color space they fall near red with variations of whiteness and blackness. The coloration of humans is not green and blue in (Red Green Blue) RGB color space. RGB color space is a color image that is a combination of 3 R, B, B images. The computing system may confirm the captured image to Hue, Saturation, and Intensity (HIS) space. The hue represents the color component of the image, saturation represents the whiteness of the image, while intensity represents a grayscale image. In hue space, the human face falls near 255 (in a scale of 0-255), which corresponds to a red component. Once the faces (heads) are detected, the edge space for hue and intensity is analyzed whereby each head may be further confirmed by looking at the hue component inside the area of the face. The detection of the head may be further confirmed (when resolution of the face is large enough) by looking for patterns of eyes, nose and lips in the edge space. Edge space is where an image is converted to edges and shapes. The processing is done on these edges and shapes. The brightness of the eyes may be further confirmed in the pixel space. Pixel space is the raw image where intensities of pixels are checked in the image. A histogram of the edge pattern may also be analyzed for facial features. The edge pattern is a set of edges within an area. For example, a face typically has certain shapes and sizes of the edges. This can be checked by looking at lengths and shapes of edges in a histogram.

Alternatively, the computer 14 may determine the presence of a human by the determination of a missing pattern on the back of a seat which indicates that a person is sitting and is blocking the patterns or the outline on the seat back. When utilizing this embodiment, the computer must ensure that a person from one row is not blocking the seat pattern in the previous row.

The present invention may also be utilized to prevent illegal video recording in a movie theater. The counting system may automatically detect the presence of video recording devices. Any recording device includes a lens that reflects light in a specular way. Due to specular reflection upon the lens, the light reflection is high from these areas. In addition, the light from the reflection does not lose its polarity. The shape of the lens, as well as the higher reflectivity may be checked to determine the presence of the recording devices. Optionally, a polarized near-infrared light may be used. The camera 12 may have the same degree polarized lens as the infrared light. The near-infrared light is projected into the area 24 where it is reflected from the recording device lens, which produces a specular reflection which passes through the camera 12's polarizer lens. The remaining portion of the image loses its polarity and thus is not bright. The image received in the camera 12 would then have only bright areas in the glass reflected surfaces. From all these bright areas, recording devices may then be identified from further shape analysis.

Figure 4A:
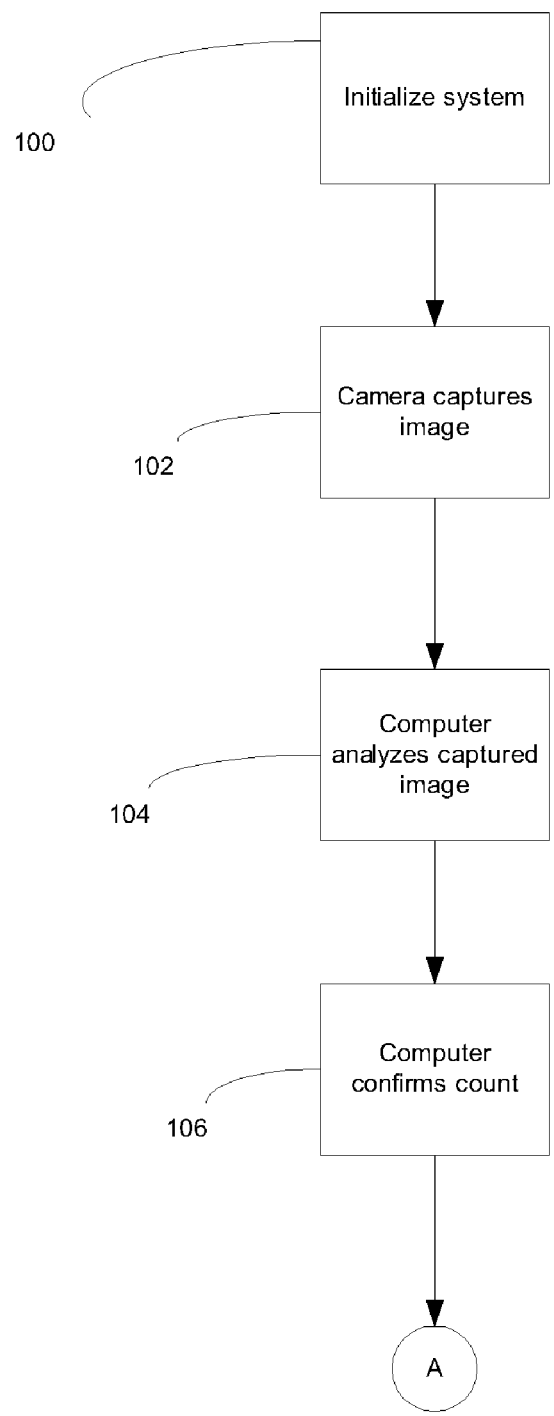
FIGS. 4A-4B are flow charts outlining the steps for counting people in the area according to the teachings of the present invention.
Figure 4B:
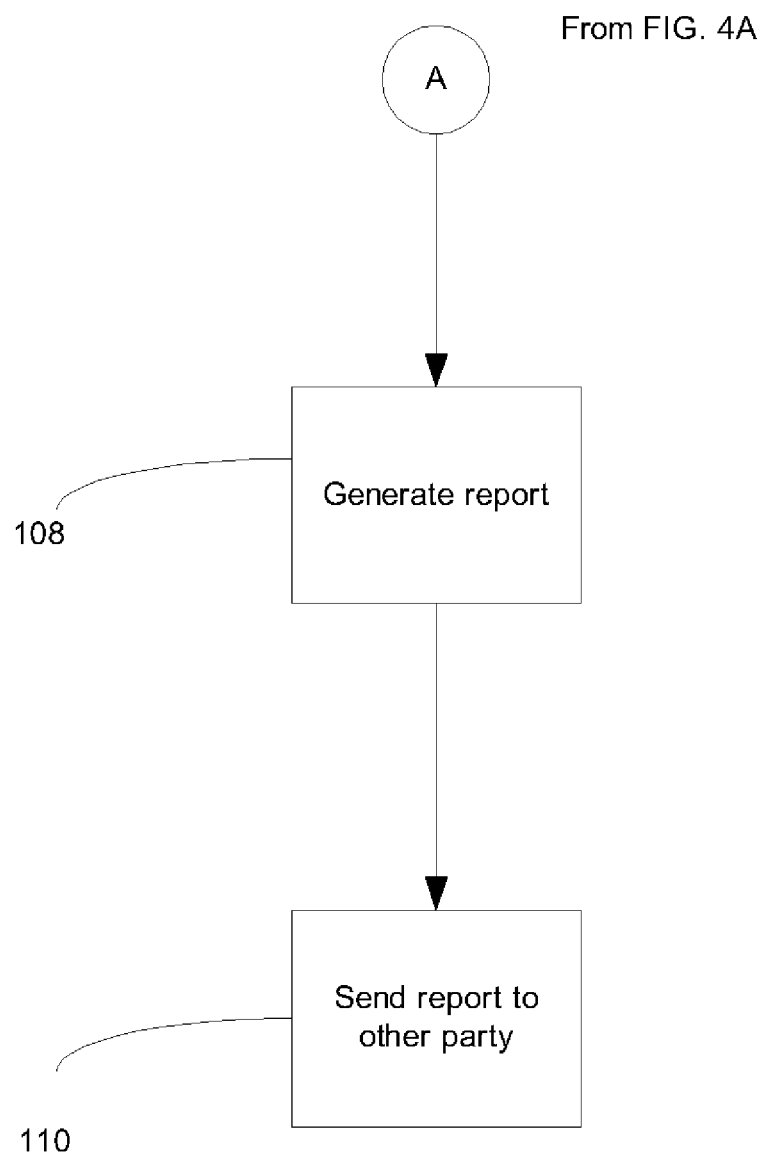

FIGS. 4A-4B are flow charts outlining the steps for counting people in the area 24 according to the teachings of the present invention. With reference to FIGS. 1-4, the steps of the method will now be explained. The method begins in step 100 where the computer 14 and camera 12 are initialized. The scene data is loaded into the computer 14. The scene data contains positions of stationary or static portions of the image. For example, for an auditorium, the positions of the seats in the field of view are loaded. This scene data may be programmed automatically or manually. This initialization may be a one time setup of the system for the specified area 24. Additionally, the system may be programmed to select count times when the counting system would be active.

Next, in step 102, the camera 12 captures an image of the scene. The image is digitized if an analog camera is utilized. The image is then passed to the memory 18 of the computer 14.

The method then moves to step 104, where the computer performs an analysis of the captured image. The number of people in the scene is determined by either recognizing shapes of faces or heads in the scene or by detecting missing patterns in the static portion of the image, such as the back of the seats. The counting system may detect heads and faces located near seats and may detect the heads and faces in open areas. Preferably, the size of the head, as seen in the image, may be computed based on the size of the seat. FIG. 3 is an illustration of the dimensioning of a typical head 40 for use with the counting system 10. Preferably, the general shape of the head is assumed to be elliptical with a horizontal dimension of X and a vertical dimension of 1.5X and is utilized to form an edge pattern by the computer. The size X may be calculated based upon magnification near the seat. The computer utilizes this edge pattern to search the captured image in gray scale and hue (color portion) of the image. If a human head is present, an edge gradient around the generated ellipse is strong. A variable operator may be used to compensate for changes in size and shape of the head from person to person.

In step 106, the head count may be further confirmed by performing further analysis to confirm the presence of people. In determining the presence of a human head, a color analysis of the shapes in the image is also conducted. Although humans have wide skin colors, in color space they fall near red with variations of whiteness and blackness. The coloration of humans is not green and blue in RGB color space. The computing system may confirm the captured image in HIS space. In hue space, the human face falls near 255 (in a scale of 0-255), which corresponds to a red component. Once the faces (heads) are detected in edge space of hue and intensity, each head may be further confirmed by analyzing the hue component inside the area of the face. The detection of the head may be further confirmed (when resolution of the face is large enough) by searching for patterns of eyes, nose and lips in the edge space. The brightness of the eyes may be further confirmed in the pixel space. Additionally, a histogram of the edge pattern may also be analyzed for facial features.

Alternatively, the computer 14 may determine the presence of a human by the determination of a missing pattern on the back of a seat, which indicates that a person is sitting and is blocking the patterns on the seat back.

The method then moves to step 108 where the computer 14 may optionally generate a report on the number of persons detected. This information may be stored in the memory 18. Next, in step 110, the report or gathered information may optionally be sent via the network 22 (e.g., Internet) to another party. In the preferred embodiment of the present invention, the system may also monitor multiple locations from a single server.

In an alternate embodiment of the present invention, the counting system 10 may be utilized to count moving or standing people. In this embodiment, the camera is preferably positioned in such a manner that each person's face is seen as the person moves. Because the people are not static, counting using a missing pattern analysis is not feasible. Additionally, magnification of the head is based on the position of the head in different areas of the image. In one embodiment, where the counting system does not have chairs (or other know size objects in the image) to measure the magnification, a different method may be used. If the camera is placed at an angle, the position of the heads in different portions of the image has different magnifications. Heads located in the bottom portion of the image may be closer to the camera and have a higher magnification. Heads located in the top portion of the image may be further away from the camera and have a lower magnification. Because the people are not stationary, a continuous count must be implemented rather than counting at a specific time. The face of a person is tracked by obtaining images on a continuous mode of the camera 12 and detecting the movement of the face position from one image to the next image. In the situation where queues of standing people are observed, when the number of people exceeds the threshold, an alarm may be activated.

The present invention provides many advantages over existing counting systems. The present invention utilizes a captured image to determine the number of people present in a specified area. The present invention may further analyze the image to confirm the presence of people and provide an accurate count. The present invention does not required extensive modifications to the area where the count is conducted and does not require manual operator input to obtain an accurate number of people.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

What is claimed is:

1. A system for counting people in a specified area, the system comprising:
   a camera for capturing an image of the specified area; and
   a computer for receiving the captured image, the computer analyzing the image to detect people;
   wherein the computer analyzes the image by forming an edge pattern of a general shape of a head of a person, utilizing the edge pattern to search the captured image in a gray scale and hue of the captured image, and detecting a human head when detecting a strong edge gradient around the edge pattern;
   wherein the computer detects head or face shapes within the image and counts the detected head or face shapes to determine a number of people within the specified area.

2. The system for counting people in a specified area of claim 1 wherein the camera captures an image at a specific time, the camera periodically capturing a single image for performing a periodic count of the specified area.

3. The system for counting people in a specified area of claim 1 wherein the computer confirms a detected head or face shape is a person by determining if the detected shape matches an approximate color of human skin by utilizing a color space to obtain a color range of human skin color.

4. The system for counting people in a specified area of claim 1 the computer confirms a detected head or face shape is a person by determining if the detected shape geometrically matches eyes, lips or nose of a human.

5. The system for counting people in a specified area of claim 1 wherein the camera utilizes setting having a high aperture and large exposure with screen illumination to capture the image.

6. The system for counting people in a specified area of claim 1 wherein the camera utilizes infrared light to illuminate the specified area.

7. The system for counting people in a specified area of claim 1 wherein the camera utilizes a single wide angle lens to obtain a count of the entire specified area.

8. The system for counting people in a specified area of claim 1 wherein the camera is positioned in a corner of the specified area and the computer utilizes image compensation to correct for angular distortion from positioning the camera at the corner of the specified area.

9. The system for counting people in a specified area of claim 1 further comprising means to detect a video recording device positioned within the specified area, the video recording device being detected by detecting a specular reflection from a lens of the video recording device.

10. The system for counting people in a specified area of claim 1 wherein the people located in the specified area are standing in a queue and, upon determining that the queue is beyond a specified length limit, the computer triggers an alarm.

11. The system for counting people in a specified area of claim 1 wherein the system further comprises means to detect a shape of a face or head in a specified area when people are moving.

12. The system for counting people in a specified area of claim 11 wherein the camera captures a series of images to detect motion of a moving person, the computer comparing the position of the face or head of each person on at least two images.

13. The system for counting people in a specified area of claim 1 wherein the specific area is an auditorium and the people are seated.

14. A method of counting people in a specified area, the method comprising the steps of:
   capturing an image by a camera of the specified area;
   analyzing the image to detect people by the computer, the computer detecting head or face shapes, wherein the step of analyzing the image to detect people includes the steps of:
      forming an edge pattern of a general shape of a head of a person;
      utilizing the edge pattern to search the captured image in a gray scale and hue of the captured image; and
      detecting a human head when detecting a strong edge gradient around the edge pattern; and
   counting the detected head or face shapes to determine a number of people within the specified area.

15. The method of counting people in a specified area of claim 14 wherein the step of analyzing the image includes the step of confirming by the computer that a detected head or face shape is a person by determining if the detected shape geometrically matches eyes, lips or nose of a human.

16. The method of counting people in a specified area of claim 14 wherein the step of analyzing the image includes the step of confirming by the computer that a detected head or face shape is a person by determining if the detected shape matches an approximate color of human skin by utilizing a color space to obtain a color range of human skin color.

17. The method of counting people in a specified area of claim 14 further comprising the step of detecting a video recording device positioned within the specified area, the video recording device being detected by detecting a specular reflection from a lens of the video recording device.

18. The method of counting people in a specified area of claim 14 wherein the people are standing in a queue and further comprises the step of issuing an alarm upon determining that the queue is beyond a specified length limit.

* * * * *